United States Patent [19]

Vainsencher

[11] Patent Number: 6,005,624

[45] Date of Patent: Dec. 21, 1999

[54] SYSTEM AND METHOD FOR PERFORMING MOTION COMPENSATION USING A SKEWED TILE STORAGE FORMAT FOR IMPROVED EFFICIENCY

[75] Inventor: Leonardo Vainsencher, San Jose, Calif.

[73] Assignee: LSI Logic Corporation, Milpitas, Calif.

[21] Appl. No.: 08/772,442

[22] Filed: Dec. 20, 1996

[51] Int. Cl.⁶ ...................................................... H04N 7/12
[52] U.S. Cl. ......................... 348/413; 348/416; 348/699; 382/56; 395/650
[58] Field of Search ...................... 348/403, 407, 348/413, 414, 415, 416, 699, 700; 382/56, 236; 358/133; 398/416; 395/650

[56] References Cited

U.S. PATENT DOCUMENTS

| | | | |
|---|---|---|---|
| 5,278,647 | 1/1994 | Hingorani et al. ....................... | 358/136 |
| 5,379,356 | 1/1995 | Purcell et al. ............................ | 382/56 |
| 5,418,952 | 5/1995 | Morley et al. ........................... | 395/650 |
| 5,430,490 | 7/1995 | Rim ....................................... | 348/452 |
| 5,510,787 | 4/1996 | Koster ...................................... | 341/76 |
| 5,552,831 | 9/1996 | Machida et al. ........................ | 348/416 |
| 5,623,459 | 4/1997 | Iwamura et al. ........................... | 369/32 |
| 5,675,387 | 10/1997 | Hoogenboom et al. ................. | 348/416 |
| 5,729,293 | 3/1998 | Keesman ................................. | 348/401 |
| 5,781,239 | 7/1998 | Mattela et al. .......................... | 348/415 |
| 5,784,011 | 7/1998 | Malladi et al. ............................ | 341/67 |
| 5,883,679 | 3/1999 | Iskarous et al. ........................ | 348/699 |

Primary Examiner—Tommy P. Chin
Assistant Examiner—Tung Vo
Attorney, Agent, or Firm—Conley, Rose & Tayon; Jeffrey C. Hood

[57] ABSTRACT

An MPEG decoder system and method for decoding frames of a video sequence. The MPEG decoder includes motion compensation logic which analyzes motion vectors in an encoded frame of the MPEG stream and uses prior decoded reference blocks to recreate the data encoded by the motion vector. The MPEG decoder stores reference block data according to a novel skewed tile arrangement to minimize the maximum number of page crossings required in retrieving this data from the memory.

11 Claims, 7 Drawing Sheets

Map of reference field/frame with odd number of macroblocks in a line

Map of reference field/frame with odd number of macroblocks in a line
FIG. 4A
FIG. 4B
Map of reference field/frame with even number of macroblocks in a line
FIG. 4C
FIG. 4D

| Page Read Order | Page Misses |
|---|---|
| y0: CBA* | 3 (ABC) |
| y1: AC | +1 (C) |
| y2: BC* | +2 (BC) |
| y3: C | 0 |

*No page misses

6 Total

| Page Read Order | Page Misses |
|---|---|
| y0: ABC* | 3 (ABC) |
| y1: CA | +1 (A) |
| y2: ABC* | +2 (BC) |
| y3: CA | +1 (A) |
| *No page misses | 7 Total |

SYSTEM AND METHOD FOR PERFORMING MOTION COMPENSATION USING A SKEWED TILE STORAGE FORMAT FOR IMPROVED EFFICIENCY

INCORPORATION BY REFERENCE

The following references are hereby incorporated by reference.

The ISO/IEC MPEG specification referred to as ISO/IEC 13818 is hereby incorporated by reference in its entirety.

FIELD OF THE INVENTION

The present invention relates generally to digital video compression, and more particularly to an MPEG decoder system for performing motion compensation which stores macroblocks in a skewed tile arrangement to reduce page crossings during block accesses and thus provide improved performance.

DESCRIPTION OF THE RELATED ART

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e., if the video clip being compressed includes many abrupt scene transitions from one image to another, the compression is less efficient. Examples of video compression which use an interframe compression technique are MPEG, DVI and Indeo, among others.

MPEG BACKGROUND

A compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield compression ratios of more than 200:1.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I or Intraframes contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe lossless compression technique. After the I frames have been created, the MPEG encoder divides respective frames into a grid of 16×16 pixel squares called macroblocks. The respective frames are divided into macroblocks in order to perform motion estimation/ compensation. Thus, for a respective target picture or frame, i.e., a frame being encoded, the encoder searches for an exact, or near exact, match between the target picture macroblock and a block in a neighboring picture referred to as a search frame. For a target P frame the encoder searches in a prior I or P frame. For a target B frame, the encoder searches in a prior and/or subsequent I or P frame. When a match is found, the encoder transmits a vector movement code or motion vector. The vector movement code or motion vector only includes information on the difference between the search frame and the respective target picture. The blocks in target pictures that have no change relative to the block in the reference picture or I frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Encoding the difference is accomplished through a math process referred to as the discrete cosine transform or DCT. This process divides the macroblock into sub blocks, seeking out changes in color and brightness. Human perception is more sensitive to brightness changes than color changes. Thus the MPEG algorithm devotes more effort to reducing color space rather than brightness.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks, and each block is transformed via the discrete cosine transform (DCT). After the transformed blocks are converted to the "DCT domain", each entry in the transformed block is quantized with respect to a set of quantization tables. The quantization step for each entry can vary, taking into account the sensitivity of the human visual system (HVS)} to the frequency. Since the HVS is more sensitive to low frequencies, most of the high frequency entries are quantized to zero. In this step where the entries are quantized, information is lost and errors are introduced to the reconstructed image. Run length encoding is used to transmit the quantized values. To further enhance compression, the blocks are scanned in a zig-zag ordering that scans the lower frequency entries first, and the non-zero quantized values, along with the zero run lengths, are entropy encoded.

As discussed above, temporal compression makes use of the fact that most of the objects remain the same between consecutive picture frames, and the difference between objects or blocks in successive frames is their position in the frame as a result of motion (either due to object motion, camera motion or both). The key to this relative encoding is motion estimation. In general, motion estimation is an essential processing requirement in most video compression algorithms. As described above, motion estimation is the task of identifying temporal redundancy between frames of the video sequence.

When an MPEG decoder receives an encoded stream, the MPEG decoder reverses the above operations. Thus the MPEG decoder performs inverse scanning to remove the zig zag ordering, inverse quantization to de-quantize the data, and the inverse DCT to convert the data from the frequency domain back to the pixel domain. The MPEG decoder also performs motion compensation using the transmitted motion vectors to re-create the temporally compressed frames.

When frames are received which are used as references for other frames, such as I or P frames, these frames are decoded and stored in memory. When a temporally compressed or encoded frame is received, such as a P or B frame, motion compensation is performed on the frame using the prior decoded I or P reference frames. The temporally compressed or encoded frame, referred to as a target frame, will include motion vectors which reference blocks in prior decoded I or P frames stored in the memory. The MPEG decoder examines the motion vector, determines the respective reference block in the reference frame, and accesses the reference block pointed to by the motion vector from the memory.

A typical MPEG decoder includes motion compensation logic which includes local or on-chip memory. The MPEG decoder also includes an external memory which stores prior decoded reference frames. The external memory is typically a paged memory which stores data in a plurality of pages. As is well known, when data is accessed within a page, the memory accesses occur quickly, i.e., without wait states, because the row address is common. However, when a page miss or page crossing occurs, i.e., when data is required which is located on a different page than the page currently being accessed, then a new RAS and CAS are required, thus requiring wait states. This increases the memory access latency and thus reduces system performance.

Therefore, a new system and method is desired for efficiently performing motion compensation in an MPEG decoder. A new system and method is desired which minimizes the maximum number of memory page crossings in retrieving reference block data for use in motion compensation. A new system and method is further desired which provides guaranteed performance characteristics.

SUMMARY OF THE INVENTION

The present invention comprises an MPEG decoder system and method for decoding frames of a video sequence. The MPEG decoder includes motion compensation logic which analyzes motion vectors in an encoded frame of the MPEG stream and uses prior decoded reference blocks to recreate the data encoded by the motion vector. The MPEG decoder stores reference block data according to a novel skewed tile arrangement to minimize the maximum number of page crossings required in retrieving this data from the memory. This provides guaranteed performance and improved efficiency according to the present invention.

The present invention preferably comprises a computer system including a video decoder or MPEG decoder which receives a compressed video file or video bitstream and generates a non-compressed or decoded video stream. The MPEG decoder includes a motion compensation block which includes local memory. An external frame store memory is coupled to the motion compensation block which stores reference or target frame data. The MPEG encoded stream includes temporally encoded frame data comprising motion vectors which each point to a reference block in a reference frame of video data stored in the frame store memory. The motion compensation system operates to decode a target block using motion vectors to a previously decoded block, referred to as the reference block or search block. The motion compensation block analyzes the motion vectors and retrieves respective reference blocks from the frame store memory in response to the motion vectors.

The reference blocks are stored in the external memory and accessed as needed by the motion compensation logic.

In general, the motion compensation logic will not know ahead of time which reference blocks from a reference frame will be required for motion compensation. The memory is a paged memory which stores data in one or more pages According to the present invention, each of the reference blocks in the reference frame are stored in the memory according to a novel skewed tile arrangement. This skewed tile memory storage arrangement limits the maximum number of page crossings which occur in retrieving a reference block from the external memory.

The frame store memory preferably stores a plurality of rows of macroblocks, wherein each page of the frame store memory stores one or more macroblocks on a respective row. According to the present invention, the pages storing macroblocks on neighboring rows are skewed relative to each other to minimize the maximum number of page crossings when a reference block of data is retrieved from the frame store memory. In the preferred embodiment, each page of the frame store memory stores two contiguous macroblocks on a row, and macroblocks stored on neighboring rows are skewed relative to each other by a macroblock width to minimize the maximum number of page crossings within a predicted field macroblock.

The present invention thus performs motion compensation with improved memory access efficiency and/or guaranteed performance characteristics.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Video Compression System

Figure 1:
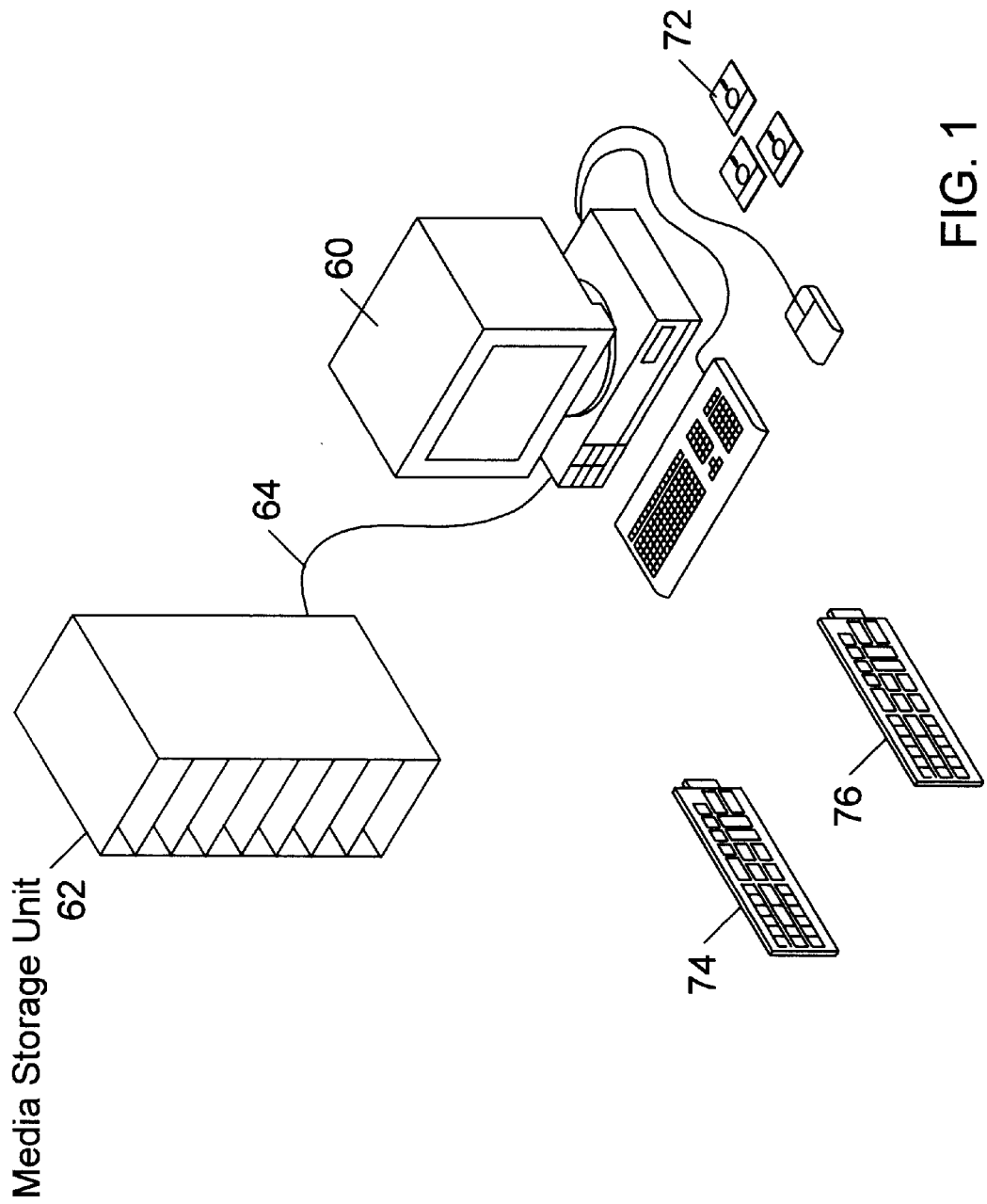
FIG. 1 illustrates a computer system which performs video decoding and which includes a motion compensation logic having a frame memory which stores reference block data in a novel skewed tile arrangement according to the present invention.

Referring now to FIG. 1, a system for performing video decoding or decompression including a motion compensation system according to the present invention is shown. The system of the present invention performs motion compensation between temporally compressed frames of a video sequence during video decoding or video decompression. In other words, the system of the present invention receives motion estimation vectors representing blocks of a video frame and restores the compressed data during video decompression. However, the system of the present invention may be used to perform motion compensation for use in any of various types of applications, as desired.

As shown, in one embodiment the video decoding or decompression system comprises a general purpose computer system 60. The video decoding system may comprise any of various types of systems, including a computer system, set-top box, television, or other device.

The computer system 60 is preferably coupled to a media storage unit 62 which stores digital video files which are to be decompressed or decoded by the computer system 60. The media storage unit 62 may also store the resultant decoded or decompressed video file. In the preferred embodiment, the computer system 60 receives a compressed video file or bitstream and generates a normal uncompressed digital video file. In the present disclosure, the term "compressed video file" refers to a video file which has been compressed according to any of various video compression algorithms which use motion estimation techniques, including the MPEG standard, among others, and the term "uncompressed digital video file" refers to a stream of decoded or uncompressed video.

As shown, the computer system 60 preferably includes a video decoder 74 which performs video decoding or decompression operations. The video decoder 74 is preferably an MPEG decoder. The computer system 60 optionally may also include an MPEG encoder 76. The MPEG decoder 74 and MPEG encoder 76 are preferably adapter cards coupled to a bus in the computer system, but are shown external to the computer system 60 for illustrative purposes. The computer system 60 also includes software, represented by floppy disks 72, which may perform portions of the video decompression or decoding operation and/or may perform other operations, as desired.

Figure 2:
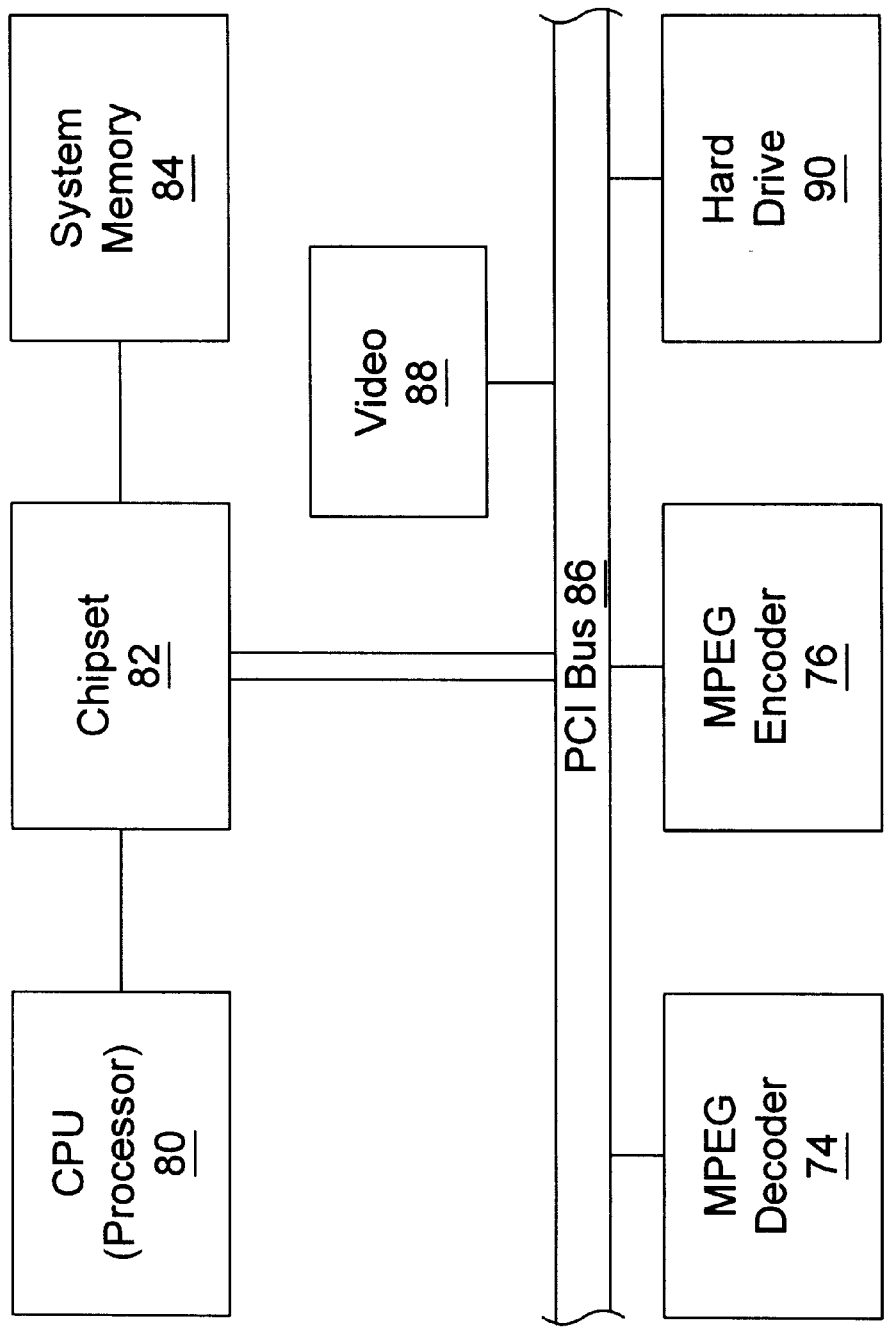
FIG. 2 is a block diagram illustrating the computer system of FIG. 1.

The computer system 60 preferably includes various standard components, including one or more processors, one or more buses, a hard drive and memory. Referring now to FIG. 2, a block diagram illustrating the components comprised in the computer system of FIG. 1 is shown. It is noted that FIG. 2 is illustrative only, and other computer architectures may be used, as desired. As shown, the computer system includes at least one processor 80 coupled through chipset logic 82 to a system memory 84. The chipset 82 preferably includes a PCI (Peripheral Component Interconnect) bridge for interfacing to PCI bus 86, or another type of bus bridge for interfacing to another type of expansion bus. In FIG. 2, MPEG decoder 74 and MPEG encoder 76 are shown connected to PCI bus 86. Various other components may be comprised in the computer system, such as video 88 and hard drive 90.

As mentioned above, in the preferred embodiment of FIG. 1 the computer system 60 includes or is coupled to one or more digital storage or media storage devices. For example, in the embodiment of FIG. 1, the computer system 60 couples to media storage unit 62 through cable 64. The media storage unit 62 preferably comprises a RAID (Redundent Array of Inexpensive Disks) disk array, or includes one or more CD-ROM drives and/or one or more Digital Video Disk (DVD) storage units, or other media, for storing digital video to be decompressed and/or for storing the resultant decoded video data. The computer system may also include one or more internal RAID arrays, CD-ROM drives and/or may couple to one or more separate Digital Video Disk (DVD) storage units. The computer system 60 also may connect to other types of digital or analog storage devices or media, as desired.

Alternatively, the compressed digital video file may be received from an external source, such as a remote storage device, a remote computer system, a satellite, or a cable network. In this embodiment, the computer system preferably includes an input device, such as an ATM (Asynchronous Transfer Mode) adapter card or an ISDN (Integrated Services Digital Network) terminal adapter, or other digital data receiver, for receiving the digital video file. The digital video file may also be stored or received in analog format and converted to digital data, either externally to the computer system 60 or within the computer system 60.

As mentioned above, the MPEG decoder 74 in the computer system 60 performs video decoding or video decompression functions. In performing video decoding or video decompression, the MPEG decoder 74 receives temporally compressed frames comprising motion vectors and uses motion compensation techniques to decompress or decode the compressed frames of the digital video file. As discussed further below, the MPEG decoder 74 in the computer system 60 stores prior decoded frames in a memory in a tiled format to allow efficient access of desired reference blocks with reduced page crossings. The MPEG decoder 74 thus performs motion compensation with improved efficiency and guaranteed performance according to the present invention.

It is noted that the system for decoding or decompressing video data may comprise two or more interconnected computers, as desired. The system for decoding or decompressing video data may also comprise other hardware, such as a set top box, either alone or used in conjunction with a general purpose programmable computer. It is noted that any of various types of systems may be used for decoding or decompressing video data according to the present invention, as desired.

Figure 3:
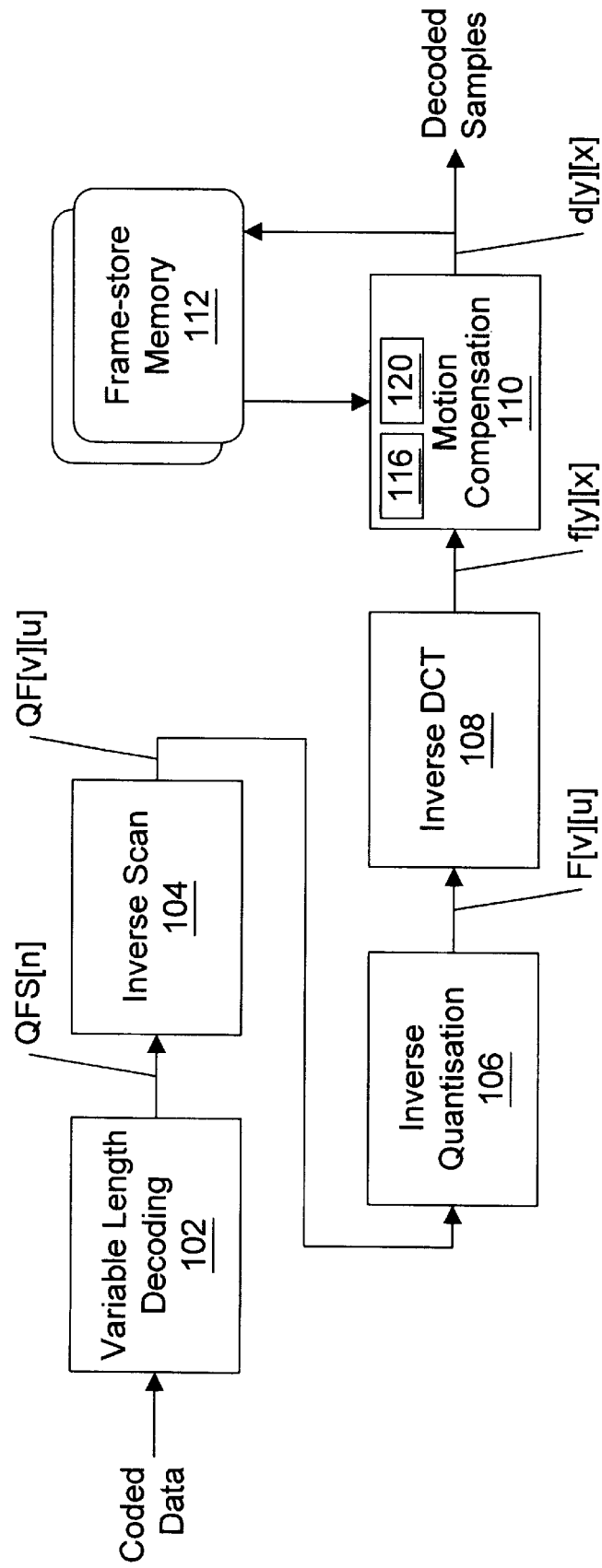
FIG. 3 is a block diagram illustrating an MPEG decoder according to the present invention.

FIG. 3—MPEG Decoder Block Diagram

Referring now to FIG. 3, a block diagram illustrating the MPEG decoder 74 which performs motion compensation according to the present invention is shown. As shown, the video decoder 74 receives an encoded or compressed digital video stream and outputs an uncompressed digital video stream. The compressed digital video stream is a bitstream of compressed video data which is used to present a video sequence, such as a television segment or movie, onto a screen, such as a television or a computer system. In the preferred embodiment, the compressed digital video stream is compressed using the MPEG-2 compression algorithm, and the video decoder 74 is thus preferably an MPEG-2 decoder. Since the operation of MPEG decoders is well known in the art, details of their operation which are not necessary to the operation of the present invention are omitted for simplicity.

As shown in FIG. 3, the MPEG decoder 74 comprises a Variable Length Decoding block 102 coupled to provide an output to an Inverse Scan block 104, which is coupled to provide an output to an Inverse Quantization block 106, which is coupled to provide an output to an Inverse DCT block 108, which is coupled to provide an output to a motion compensation block 110. The motion compensation block 110 provides an output comprising decoded samples. A frame store memory 112 is coupled to the output of the motion compensation block 110 to receive and store decoded frame data. The motion compensation block 110 is coupled to an output of the frame store memory 112 to receive reference block data from the frame store memory 112 during motion compensation.

As shown in FIG. 3, the Variable Length Decoding block 102 receives coded data and performs variable length decoding. As is well known, the MPEG standard provides that data is compressed for transmission using variable length codes. Thus the Variable Length Decoding block 102 decodes this data and produces an output, referred to as QFS[n]. The QFS[n] output of the Variable Length Decoding block 102 is provided to the Inverse Scan block 104. The Inverse Scan block 104 reverses the zig zag scan ordering of the received data (is this right) and produces an output referred to as QF[v][u]. The output QF[v][u] is provided to the Inverse Quantization block 106. The Inverse Quantization block 106 performs inverse quantization or de-quantizes the data to produce de-quantized data, referred to as F[v][u]. The output F[v][u] of the Inverse Quantization block 106 is provided to the Inverse DCT block 108, which performs the inverse discrete cosine transform to convert the data from the frequency domain back to the pixel domain. The inverse DCT block 108 produces an output referred to as f[y][x]. The output f[y][x] of the inverse DCT block 108 is provided to the motion compensation block 110.

The output f[y][x] from the inverse DCT block 108 comprises temporally encoded frames of pixel data. The motion compensation block 110 decompresses the temporally compressed frames using motion compensation techniques. As described above, an MPEG encoded stream comprises I, P and B frames. P and B frames are temporally compressed relative to other frames. P frames are temporally compressed relative to prior I or P frames, and B frames are temporally compressed relative to prior or subsequent I or P frames. When a frame is temporally compressed, the frame is partitioned into macroblocks, referred to as target blocks, and then the compression method searches in neighboring frames for blocks which are most similar to the block being encoded. When the best fit block is found, the respective target block is encoded by a motion vector which points to this best fit reference block in the reference frame. The difference between the block being encoded and the best fit block is also computed and transferred in the MPEG stream.

Output pixel values from the motion compensation block 110 are provided to a frame store memory 112. The frame store memory 112 is thus coupled to the motion compensation block 110 and stores one or more reference frames of video data. These reference frames of video data are used in performing motion compensation on temporally compressed frames, such as P and B frames. In general, an MPEG stream includes encoded reference frame data which is transmitted before temporally compressed data that depends on the prior transmitted reference frame data. Thus, incoming temporally encoded frame data, such as P and B frame data, comprises motion vectors which point to reference blocks in a prior transmitted reference frame of video data, which has been stored in the frame store memory 112. The motion compensation block 110 analyzes each motion vector from the incoming temporally compressed data and retrieves a reference block from the frame store memory 112 in response to each motion vector. The motion compensation block 110 includes a local memory or on-chip memory 116 which stores the retrieved reference block. The motion compensation block 110 then uses this retrieved reference block to decompress the temporally compressed data.

In the preferred embodiment, the frame store memory 112 is 1M×16 SDRAM, such as Samsung KM416S1120AT-12, having an operating frequency of 67.5 MHz and a burst size of 4 words. The frame store memory 112 is preferably a paged memory which stores data in a plurality of pages. As is well known, paged memories typically utilize a row address strobe (RAS) and a column address strobe (CAS) to access data within the respective pages. As is also well known, when data is accessed within a page, the memory accesses occur quickly because the row is common, and no wait states are required. However, when a page miss or page crossing occurs, i.e., when data is required which is located on a different page than the page currently being accessed, then a new RAS and CAS are required, which requires wait states. This increases the memory access latency and thus reduces performance.

According to the present invention, each of the reference blocks in the reference frame are stored in the frame store memory 112 according to a novel skewed tile arrangement. This skewed tile memory storage arrangement limits the maximum number of page crossings which occur in retrieving a reference block from the frame store memory 112.

As shown, the motion compensation logic 110 includes a memory controller 120 which accesses a reference block from the frame store memory 112 based upon a received motion vector in a temporally compressed frame. As discussed further below, the memory controller 120 intelligently accesses the entire portion of a reference block from each respective memory page where the data resides to minimize the number of page crossings required.

Figure 4:
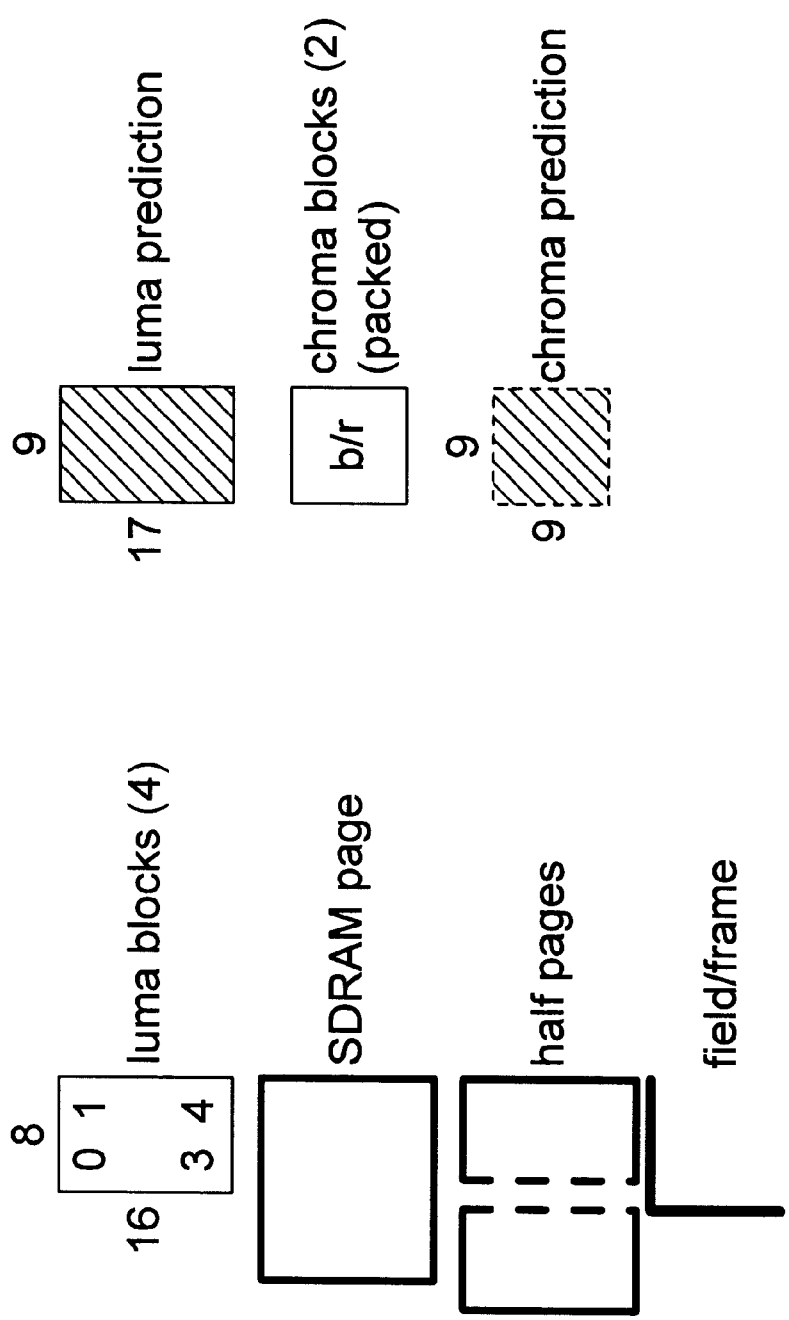
FIG. 4 illustrates storage of reference blocks according to a novel skewed tile arrangement according to the present invention.

FIG. 4—Skewed Tile Memory Storage

Referring now to FIG. 4, a diagram illustrating a manner in which reference macroblocks or reference blocks are stored in the frame store memory 112 in a skewed tile arrangement according to the preferred embodiment of the present invention is shown. As shown, the frame store memory 112 preferably stores a plurality of rows of macroblocks, wherein each page of the frame store memory stores one or more macroblocks on a respective row. According to the present invention, the pages storing macroblocks on neighboring rows are skewed relative to each other to minimize the maximum number of page crossings when a reference block of data is retrieved from the frame store memory 112.

As shown in FIG. 4, a reference frame can be considered as a plurality of rows of macroblocks. Macroblocks in neighboring rows or lines are skewed as shown in FIGS. 4a–4d to reduce page crossings or page misses within a predicted field macroblock. In the preferred embodiment, each page of the frame store memory 112 stores two contiguous luma macroblocks on a row, and luma macroblocks stored on neighboring rows are skewed relative to each other by a macroblock width to minimize the maximum number of page crossings within a predicted field macroblock.

FIG. 4a illustrates a map of a reference field/frame of luma blocks with an odd number of macroblocks in a line, and FIG. 4c illustrates a map of a reference field/frame of luma blocks with an even number of macroblocks in a line. Similarly, FIG. 4b illustrates a map of a reference field/frame of chroma blocks with an odd number of macroblocks in a line, and FIG. 4d illustrates a map of a reference field/frame of chroma blocks with an even number of macroblocks in a line.

As shown, FIGS. 4a and 4c illustrate a manner in which luma blocks are stored in the skewed tile arrangement of the present invention. As shown, in the preferred embodiment luma blocks of two configuous macroblocks, preferably from the same line or row of macroblocks, occupy one SDRAM page, which comprises 256 words in the preferred embodiment. As shown in FIGS. 4b and 4d, a single memory page stores four contiguous chroma macroblocks, preferably in a 2×2 arrangement. Thus, a single memory page stores four contiguous chroma macroblocks, with two blocks each from two neighboring rows.

In FIGS. 4a and 4c, the luma prediction block or reference block is shown shaded. As shown, the luma prediction block requires only three page crossings to be retrieved from the frame store memory 112. It is noted that, no matter where the luma prediction block or reference block is located within the reference frame in the frame store memory 112, a maximum of three page crossings is required to retrieve the respective luma reference block from the frame store memory 112. Similarly, in FIGS. 4b and 4d, a chroma prediction block or reference block is shown shaded. It is noted that, no matter where the chroma prediction block or reference block is located within the reference frame in the frame store memory 112, a maximum of three page crossings is required to retrieve the respective chroma reference block from the frame store memory 112.

In the preferred embodiment of the invention, the motion compensation block 110 includes a memory controller 120 which operates to read reference blocks or prediction blocks from the frame store memory 112. When retrieval of a reference block from the frame store memory 112 requires one or more page crossings, the memory controller 120 reads the entire relevant portion from a respective page before a page crossing or cross miss occurs, i.e., before the memory controller 120 begins reading another reference block portion from another page. In the examples of FIG. 4, the memory controller 120 which performs the read operation is sufficiently intelligent to read or subdivide the prediction macroblock (the shaded area of FIGS. 4a–4c) into three regions, where each one resides on a different page. The memory controller 120 reads each one of these subdivision blocks in turn. Thus the memory controller 120 reads all of the shaded portion from the first macroblock or first page, then all of the shaded portion from the second macroblock or second page, and then all of the shaded portion from the third macroblock or third page.

In the preferred embodiment of the invention, the reference frame memory map is such that a top field resides in a first bank A and a bottom field resides in a second bank B. Alternatively, the entire reference frame is stored in a contiguous bank of memory.

Figure 5:
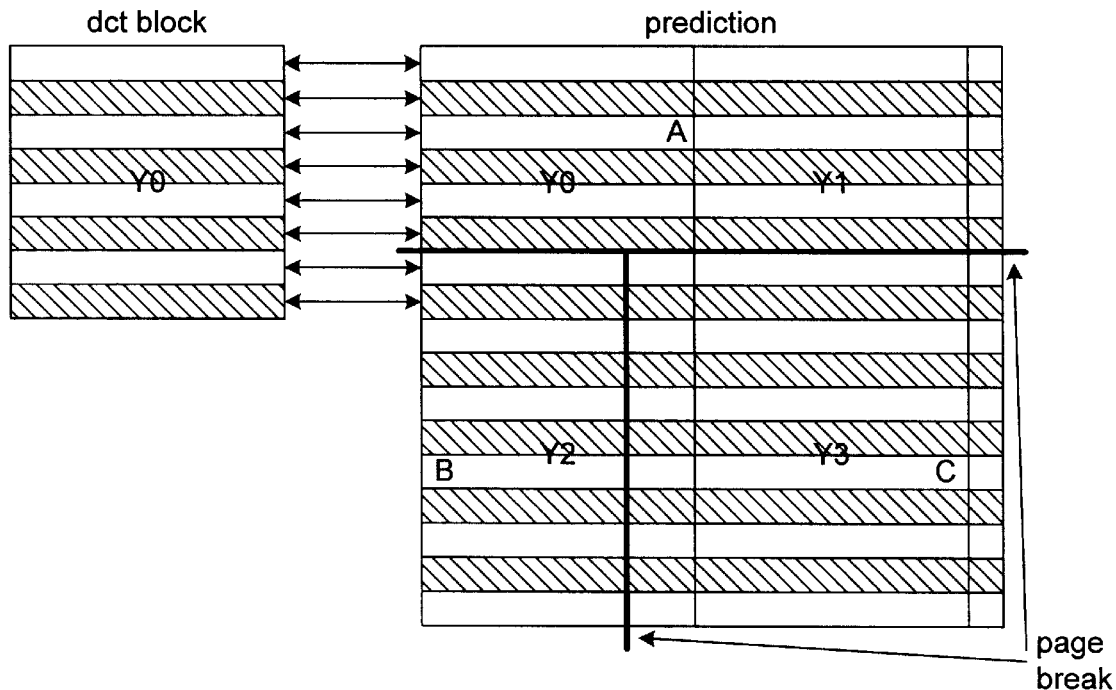
FIG. 5 illustrates motion compensation using frame based prediction where the DCT block stores data in a frame mode including lines from alternating fields.
Figure 6:
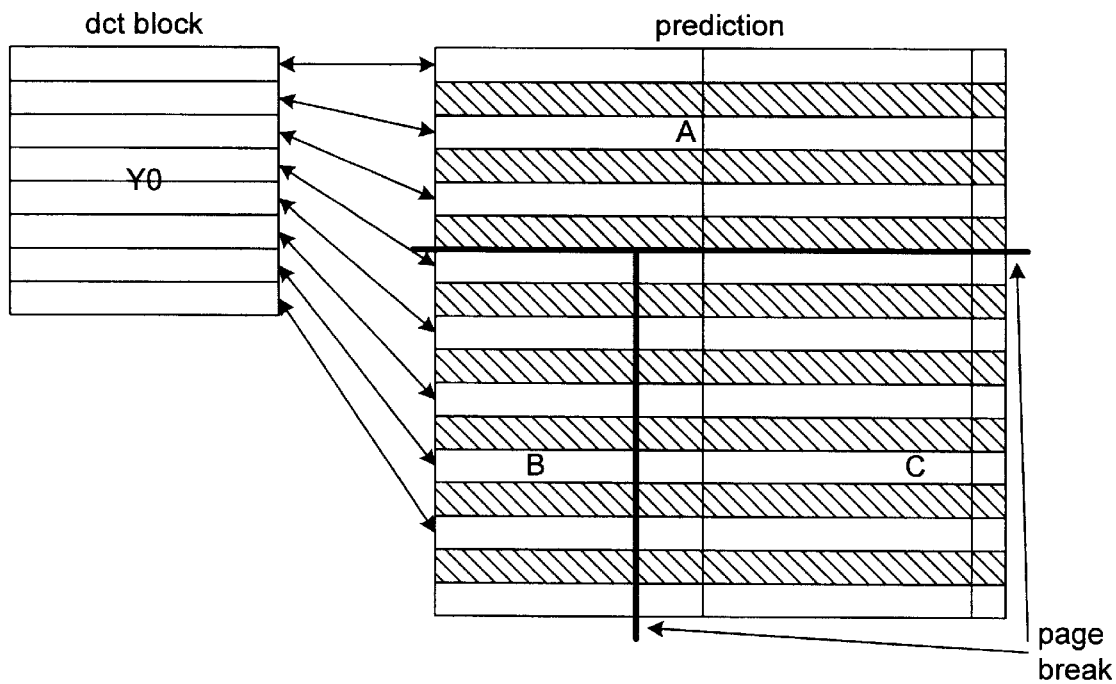
FIG. 6 illustrates motion compensation using frame based prediction where the DCT block stores data in a field mode including lines from a single field.

FIGS. 5 and 6—Frame Based Prediction

Referring now to FIGS. 5 and 6, motion compensation which occurs within a frame, i.e., frame based prediction, is shown. FIG. 5 illustrates a frame DCT embodiment, where lines in a DCT block or target block being decoded correspond to lines from alternating fields within the reference frame. In other words, as mentioned above, the frame store memory 112 stores a reference frame of data as two fields, preferably comprising odd and even pixel scan lines. In the frame DCT embodiment of FIG. 5, the target block or DCT block includes lines from both fields, or from alternating fields, as shown. It is noted that in this embodiment, page breaks or page crossings occur for each field. However, since fields reside in different banks and motion vectors are the same for both fields, the page crossings occur in the same location for each respective bank or field, and thus the number of page misses is not doubled.

For the highest on chip memory or local memory efficiency, the on chip memory 116 is preferably kept at a minimal size, and only the prediction block or reference block is read. Thus, in one embodiment, for highest on chip memory efficiency, the on chip memory 116 is preferably only sufficiently large to store a single 8×8 sub-block. In this embodiment, the on chip memory 116 retrieves a reference macroblock from the frame store memory 112 as four 8×8 sub-blocks read sequentially. This requires a greater number of page crossings, but requires a lesser amount of on chip memory. It is noted that, where the on chip memory 116 is only sufficiently large to store a single 8×8 sub-block, page crossings may be required for each sub-block that is read. Thus, for the example of FIG. 5, the number of page crossings would be: Y0:3, Y1:+1, Y2:+2, Y3:0, CR:3, CB:+

2. This provides a total of 11 page crossings, and the total number of words read is 6×9×5=270.

For the highest off chip memory or frame store memory access efficiency, the on chip memory 116 is preferably sufficiently large to store an entire macroblock. Thus, the entire macroblock can be read from the frame store memory 112 and provided at a single time to the on chip memory 116. Thus, for the highest off chip memory access efficiency, i.e., for the highest memory access efficiency for the frame store memory 112, the memory controller 120 preferably reads the entire luma block and then reads the entire chroma block. The number of page crossings for the luma and chroma block for each is 3, thus producing a total of 6 page crossings. The total number of words read is 17×9+9×9= 234.

FIG. 6 illustrates a field DCT embodiment where all lines in the DCT luma blocks correspond to lines from a single field. It is noted that the page breaks shown in FIG. 6 are for each field of the reference block. Since fields reside in different banks and motion vectors are the same for both fields, page crossings occur in the same position, and thus the number of page misses is not doubled.

For the highest on chip memory efficiency in the embodiment of FIG. 6, the memory controller 120 again just reads a prediction block at a time, and the local or on chip memory is preferably kept at a minimal size. Thus, as discussed above, the on chip memory 116 is only sufficiently large to store a single 8×8 sub-block in this embodiment. When the desired macroblock is read, each of the respective 8×8 sub-blocks are read one at a time and provided to the on chip memory 116. Thus, the on-chip memory 116 is only required to be large enough to store a single 8×8 sub-block is not required to store an entire macroblock at a time. In the embodiment of FIG. 6, where the on chip memory is only required to store 1×8 block, the page crossing required to read a reference macroblock from the frame store memory 112 is as follows: Y0:3, Y1:+1, Y2:+2, Y3:+1, CR:3, CB:+2. Thus, the total number of page crossings in this embodiment is 12. This is different than FIG. 5 because Y3 incurs an extra page miss, as shown in FIGS. 5 and 6, and the total number of words read is 6×17×5=510. It is noted that both fields must be read in order to perform half pel interpolation.

For the highest off chip memory access efficiency, the on chip memory 116 presumably can store an entire macroblock. In this embodiment, the memory controller 120 simply reads the entire luma macroblock and then reads the entire chroma macroblock. This embodiment requires three page crossings to read each of the luma macroblock and chroma macroblock for a total of six page crossings. In this embodiment, the total number of words read is 17×9+9×9= 234 words.

Conclusion

Therefore, the present invention comprises a system and method for performing motion compensation on a compressed digital video stream. The present invention stores reference frames in a skewed tile format which minimizes the maximum number of page crossings or page misses when retrieving this data. This provides improved and/or guaranteed performance for the motion compensation system.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A system for performing motion compensation with improved memory storage of reference block data, comprising:
    a motion compensation block which receives temporally encoded frame data and produces decoded data; and
    a frame store memory coupled to the motion compensation block for storing at least one reference frame of video data, wherein the frame store memory is a paged memory, wherein the at least one reference frame of video data is stored in a skewed tile format in the frame store memory to minimize the maximum number of page crossings when a reference block of data is retrieved from the frame store memory;
    wherein each page of said frame store memory stores two or more macroblocks on a respective row; and
    wherein pages storing macroblocks on neighboring rows are skewed relative to each other by at least a macroblock width.

2. The system of claim 1, wherein the temporally encoded frame data comprises one or more motion vectors which point to a reference block in said at least one reference frame of video data stored in said frame store memory;
    wherein the motion compensation block analyzes said one or more motion vectors and retrieves one or more reference blocks from said frame store memory in response to said one or more motion vectors;
    wherein one or more reference blocks are retrieved from said frame store memory with a guaranteed maximum number of page crossings.

3. The system of claim 2, wherein said frame store memory stores a reference block in at least first and second pages, wherein said first page stores a first reference block portion and said second page stores a second reference block portion;
    wherein said motion compensation block includes a local memory;
    wherein said motion compensation block includes a memory controller which accesses one or more reference blocks from said frame store memory in response to said one or more motion vectors and stores said one or more reference blocks in said local memory;
    wherein said memory controller accesses the entire first reference block portion of said reference block from said first page before accessing said second reference block portion of said reference block from said second page.

4. The system of claim 1, wherein each page of said frame store memory stores two contiguous luma macroblocks on a row.

5. The system of claim 1, wherein each page of said frame store memory stores four contiguous chroma macroblocks on two or more rows.

6. An MPEG decoder with improved memory storage of reference block data, comprising:
    a variable length decoding block for receiving coded data and producing variable length decoded data;
    an inverse scanning block which receives said variable length decoded and produces inverse scanned data;
    an inverse quantization block which receives said inverse scanned data and produces de-quantized data;
    an inverse DCT block which receives said de-quantized data and produces temporally encoded frame data;
    a motion compensation block which receives said temporally encoded frame data and produces decoded data; and a frame store memory coupled to the motion compensation block for storing at least one reference frame of video data, wherein the frame store memory is a paged memory, wherein the at least one reference frame of video data is stored in a skewed tile format in the frame store memory to minimize the maximum number of page crossings when a reference block of data is retrieved from the frame store memory, wherein each page of said frame store memory stores two or more macroblocks on a respective row, and wherein pages storing macroblocks on neighboring rows are skewed relative to each other by at least a macroblock width.

7. The MPEG decoder of claim 6, wherein the temporally encoded frame data comprises one or more motion vectors which point to a reference block in said at least one reference frame of video data stored in said frame store memory;

wherein the motion compensation block analyzes said one or more motion vectors and retrieves one or more reference blocks from said frame store memory in response to said one or more motion vectors;

wherein one or more reference blocks are retrieved from said frame store memory with a guaranteed maximum number of page crossings.

8. The MPEG decoder of claim 6, wherein each page of said frame store memory stores two contiguous macroblocks on a row;

wherein macroblocks stored on neighboring rows are skewed relative to each other by a macroblock width to minimize the maximum number of page crossings within a predicted field macroblock.

9. The MPEG decoder of claim 6, wherein each page of said frame store memory stores two contiguous luma macroblocks on a row.

10. The MPEG decoder of claim 6, wherein each page of said frame store memory stores four contiguous chroma macroblocks on two or more rows.

11. An MPEG decoder with improved performance in accessing reference block data stored in a memory in a skewed tile format, wherein the memory is configured to store a plurality of macroblocks of video data, the macroblocks being arranged in a plurality of rows oriented in a first direction wherein each of the rows has at least one adjacent row and each of the macroblocks has at least one adjacent macroblock in the at least one adjacent row, the decoder comprising:

a variable length decoding circuit for receiving coded data and producing variable length decoded data;

an inverse scanning circuit which receives the variable length decoded data and produces inverse scanned data;

an inverse quantization circuit which receives the inverse scanned data and produces de-quantized data;

an inverse DCT circuit which receives the de-quantized data and produces temporally encoded frame data, the temporally encoded frame data containing one or more motion vectors;

a motion compensation circuit which receives the temporally encoded frame data and produces decoded video data; and a frame store memory coupled to the motion compensation circuit, wherein the frame store memory contains a plurality of pages, wherein the frame store memory is configured to store a frame of video data, the frame of video data containing a plurality of macroblocks of video data, the macroblocks being arranged in a plurality of rows oriented in a first direction wherein each of the rows has at least one adjacent row displaced therefrom in a second direction perpendicular to said first direction and wherein each of the macroblocks is aligned in the second direction with an adjacent macroblock in the at least one adjacent row, wherein each macroblock has a macroblock height in the second direction and a macroblock width in the first direction, wherein each of the pages is configured to store at least two consecutive macroblocks from one of the rows, wherein a plurality of page boundaries are defined in each row and wherein the page boundaries of each row are displaced in the first direction by a magnitude of at least one macroblock width form the page boundaries of each adjacent row;

wherein the motion compensation circuit analyzes the one or more motion vectors and retrieves one or more reference blocks from the frame store memory in response to the one or more motion vectors, each reference block being displaced from a corresponding one of the macroblocks by one of the motion vectors; and wherein the reference block has a reference block width equal to the macroblock width and a reference block height equal to the macroblock height, wherein the reference block can overlap one or more of the macroblocks and wherein the reference block can overlap a maximum of three of the pages.

* * * * *